(12) United States Patent
West

(10) Patent No.: US 11,767,809 B2
(45) Date of Patent: Sep. 26, 2023

(54) TEXTILE CASCADE ASSEMBLY

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/900,946

(22) Filed: Sep. 1, 2022

(65) Prior Publication Data

US 2022/0412288 A1    Dec. 29, 2022

Related U.S. Application Data

(62) Division of application No. 17/165,433, filed on Feb. 2, 2021, now Pat. No. 11,459,979.

(51) Int. Cl.
*F02K 1/72*    (2006.01)

(52) U.S. Cl.
CPC .......... *F02K 1/72* (2013.01); *F05D 2240/129* (2013.01); *F05D 2300/601* (2013.01)

(58) Field of Classification Search
CPC ..... F02K 1/72; F02K 1/70; F02K 1/62; F02K 1/625; F02K 1/645; F05D 2240/129
See application file for complete search history.

(56) References Cited

U.S. PATENT DOCUMENTS

| | | | |
|---|---|---|---|
| 3,302,404 A | | 2/1967 | Gist, Jr. |
| 4,823,547 A | * | 4/1989 | Newton .................... F02K 1/72 |
| | | | 239/265.31 |
| 7,866,142 B2 | | 1/2011 | Beardsley et al. |
| 9,874,176 B2 | | 1/2018 | Nakhjavani |
| 9,895,840 B2 | | 2/2018 | Bartel et al. |
| 10,533,521 B2 | | 1/2020 | Harpal et al. |
| 10,718,356 B2 | | 7/2020 | Werbelow et al. |
| 2013/0146171 A1 | | 6/2013 | Quigley et al. |
| 2019/0032601 A1 | * | 1/2019 | Harpal .................... F02K 1/763 |
| 2019/0285028 A1 | | 9/2019 | Shetty et al. |

* cited by examiner

*Primary Examiner* — Andrew H Nguyen
(74) *Attorney, Agent, or Firm* — HOVEY WILLIAMS LLP

(57) ABSTRACT

A cascade assembly for a thrust reverser of an aircraft engine. The cascade broadly comprises a number of vanes formed of a pliable material and shiftable between a collapsed position when the thrust reverser is in a stowed configuration and a distended position when the thrust reverser is in a deployed configuration to redirect fan duct flow in a reverse thrust flow opening created by the thrust reverser.

20 Claims, 7 Drawing Sheets

TEXTILE CASCADE ASSEMBLY

RELATED APPLICATIONS

This divisional patent application claims priority benefit to earlier-filed U.S. patent application Ser. No. 17/165,433, titled "TEXTILE CASCADE ASSEMBLY", filed Feb. 2, 2021. The earlier-filed patent application is hereby incorporated by reference, in its entirety, into the present application.

BACKGROUND

Thrust reverser cascade assemblies increase the size and weight of aircraft engine nacelles, which adds aerodynamic drag. Cascade assemblies also produce limited reverse thrust. Furthermore, they require complicated mounting structures and are difficult to fabricate.

SUMMARY

Embodiments of the invention solve the above-mentioned problems and other problems and provide a distinct advancement in the art of thrust reverser cascade assemblies. More particularly, the invention provides a lightweight, textile cascade assembly configured to pliably collapse into a small volume when not in use. The cascade assembly is also easier to manufacture and install in a thrust reverser.

An embodiment of the invention is a cascade assembly broadly comprising a number of vanes, a forward connection point, an aft connection point, and a rear support member. The cascade assembly may be part of a thrust reverser configured to generate reverse thrust from an aircraft engine via a reverse thrust flow opening.

The vanes include a number of longitudinal panels and a number of lateral panels and form several channels for redirecting fan duct flow through the reverse thrust flow opening when the thrust reverser is in a deployed configuration and the vanes are distended. The vanes are formed of a pliable textile material.

The longitudinal panels extend from a forward end of the cascade assembly to an aft end of the cascade assembly. The longitudinal panels may be substantially straight or may be curved to increase a lateral component of the fan duct flow.

The lateral panels extend between opposite sides of the cascade assembly. The lateral panels are curved to redirect the fan duct flow at least partially forward out of the reverse thrust flow opening.

The forward connection point connects the vanes to a forward structure of the thrust reverser. The aft connection point connects the vanes to the rear support member. The aft connection point may have a fixed spacing from the forward connection point.

The rear support member is connected to the vanes at the aft connection point and may be positioned in an open-ended chamber of a sleeve of the thrust reverser. The rear support member may be configured to move relative to the sleeve when the thrust reverser is actuated to a deployed configuration. To that end, the rear support member may translate within the open-ended chamber during thrust reverser actuation.

In use, the cascade assembly redirects fan duct flow when the thrust reverser is actuated from a stowed configuration to a deployed configuration. Specifically, the sleeve shifts rearward relative to the forward structure to create the reverse thrust flow opening and expose the cascade assembly in the reverse thrust flow opening. A blocker door also blocks off a forward thrust flow path to redirect fan duct flow to the reverse thrust flow opening. The fan duct flow passes through the channels to distend the vanes. The distended vanes turn the fan duct flow to have a forward component, thereby decelerating the aircraft.

The vanes collapse when the thrust reverser is actuated from the deployed configuration to the stowed configuration. Specifically, the sleeve shifts toward the forward structure to close off the reverse thrust flow opening. The pliable textile material allows the vanes to fold, crease, roll, scrunch, twist, curl, crease, compress, or pack into the open-ended chamber. To that end, the vanes may collapse along a single plane or axis or in at least two directions.

Another embodiment of the invention is a cascade assembly broadly comprising a number of vanes, a forward connection point, an aft connection point, and a rear support member. The cascade assembly may be part of a thrust reverser configured to generate reverse thrust from an aircraft engine via a reverse thrust flow opening.

The vanes include a number of longitudinal panels and a number of lateral panels. The vanes form several channels for redirecting fan duct flow through the reverse thrust flow opening when the thrust reverser is in a deployed configuration and the vanes are distended.

Some of the vanes (aft vanes in particular) are closed-end cells configured to inflate instead of allowing duct flow to pass through. Some of the lateral panels of the closed-end cells form a blocker panel configured to contact an inner wall of the thrust reverser when the closed-end cells are inflated. The blocker panel aids in cascade distension, flow redirection, and cascade support.

In use, the cascade assembly redirects fan duct flow when the thrust reverser is actuated from a stowed configuration to a deployed configuration. Specifically, the sleeve shifts rearward relative to the forward structure to create the reverse thrust flow opening and expose the cascade assembly in the reverse thrust flow opening. Some of the vanes inflate so that the blocker panel blocks off a forward thrust flow path to redirect fan duct flow to the reverse thrust flow opening. The fan duct flow passes through the channels to distend the vanes, or they may be distended due to the aforementioned vane inflation. The distended vanes turn the fan duct flow to have a forward component thereby decelerating the aircraft.

The vanes collapse when the thrust reverser is actuated from the deployed configuration to the stowed configuration. Specifically, the sleeve shifts toward the forward structure to close off the reverse thrust flow opening. The pliable textile material allows the vanes to fold, crease, roll, scrunch, twist, curl, crease, compress, or pack into the open-ended chamber.

Another embodiment of the invention is a cascade assembly constructed broadly comprising a number of vanes, a forward connection point, an aft connection point, a rear support member, and a number of biasing members. The cascade assembly may be part of a thrust reverser configured to generate reverse thrust from an aircraft engine via a reverse thrust flow opening.

The vanes include a number of longitudinal panels and a number of lateral panels. The vanes form several channels for redirecting fan duct flow through the reverse thrust flow opening when the thrust reverser is in a deployed configuration and the vanes are distended.

The biasing members may be spaced apart from each other throughout the vanes and may be sewn in or embedded in the lateral panels. The biasing members may be compressed, coiled, or stressed when the vanes are stowed. The biasing members may be leaf springs, coil springs, torsion springs, or the like. The biasing members urge the vanes to a distended position when the thrust reverser is deployed. The biasing members may also stabilize and reinforce the longitudinal panels and lateral panels and reinforce a shape of the lateral panels.

In use, the cascade assembly redirects fan duct flow when the thrust reverser is actuated from a stowed configuration to a deployed configuration. Specifically, the sleeve shifts rearward relative to the forward structure to create the reverse thrust flow opening and expose the cascade assembly in the reverse thrust flow opening. A blocker door also blocks off a forward thrust flow path to redirect fan duct flow to the reverse thrust flow opening. The biasing members expand, uncoil, or relax to distend the vanes in the reverse thrust flow opening. The distended vanes turn the fan duct flow to have a forward component, thereby decelerating the aircraft.

The vanes collapse when the thrust reverser is actuated from the deployed configuration to the stowed configuration. Specifically, the sleeve shifts toward the forward structure to close off the reverse thrust flow opening. The pliable textile material allows the vanes to fold, crease, roll, scrunch, twist, curl, crease, compress, or pack into the open-ended chamber. The biasing members are recompressed, recoiled, or restressed as the vanes are stowed.

Another embodiment of the invention is a cascade assembly broadly comprising a number of vanes, a forward connection point, an aft connection point, and a forward support member. The cascade assembly may be part of a thrust reverser configured to generate reverse thrust from an aircraft engine via a reverse thrust flow opening.

The vanes include a number of longitudinal panels and a number of lateral panels. The vanes form several channels for redirecting fan duct flow through the reverse thrust flow opening when the thrust reverser is in a deployed configuration and the vanes are distended.

The forward support member is connected to the vanes at the forward connection point and is positioned in an open-ended chamber of a forward structure of the thrust reverser. The forward support member is configured to move at least somewhat in unison with the sleeve of the thrust reverser when the thrust reverser is actuated to a deployed configuration. To that end, the forward support member may translate within the open-ended chamber during thrust reverser actuation.

In use, the cascade assembly redirects fan duct flow when the thrust reverser is actuated from a stowed configuration to a deployed configuration. Specifically, the sleeve shifts rearward relative to the forward structure to create the reverse thrust flow opening and to draw the cascade assembly out of the open-ended chamber of the forward structure. A blocker door also blocks off a forward thrust flow path to redirect fan duct flow to the reverse thrust flow opening. The fan duct flow passes through the channels to distend the vanes. The distended vanes turn the fan duct flow to have a forward component thereby decelerating the aircraft.

The vanes collapse when the thrust reverser is actuated from the deployed configuration to the stowed configuration. Specifically, the sleeve shifts toward the forward structure to close off the reverse thrust flow opening. The pliable textile material allows the vanes to fold, crease, roll, scrunch, twist, curl, crease, compress, or pack into the open-ended chamber. The pliable textile material reduces the storage space needed, which allows the vanes to be stowed in the forward structure and decreases the overall size of the engine's nacelle.

Another embodiment of the invention is a cascade assembly broadly comprising a number of vanes, a forward connection point, an aft connection point, a rear support member, an inflation scoop, and an inflation tube. The cascade assembly may be part of a thrust reverser configured to generate reverse thrust from an aircraft engine via a reverse thrust flow opening.

The vanes include a number of longitudinal panels and a number of lateral panels. The vanes form several channels for redirecting fan duct flow through the reverse thrust flow opening when the thrust reverser is in a deployed configuration and the of vanes are distended.

The inflation scoop is a modified vane near the front of the cascade assembly and connected to the inflation tube for directing some fluid flow into the inflation tube. To that end, the inflation scoop may extend lower than the other vanes near the forward support structure.

The inflation tube is fluidly connected between the inflation scoop and some of the other vanes. To that end, the inflation tube includes a number of openings for distributing the fluid flow collected by the inflation scoop to the connected vanes. In one embodiment, the inflation tube extends from the inflation scoop near the front of the cascade assembly to an aft end of the cascade assembly with the openings passing through certain longitudinal panels.

In use, the cascade assembly redirects fan duct flow when the thrust reverser is actuated from a stowed configuration to a deployed configuration. Specifically, the sleeve shifts rearward relative to the forward structure to create the reverse thrust flow opening and expose the cascade assembly in the reverse thrust flow opening. A blocker door also blocks off a forward thrust flow path to redirect fan duct flow to the reverse thrust flow opening. The inflation scoop directs some of the fan duct flow into the inflation tube. The inflation tube distributes the fan duct flow collected by the inflation scoop to some of the vanes via the openings to distend the vanes. The distended vanes turn the fan duct flow to have a forward component thereby decelerating the aircraft.

The vanes, inflation scoop, and inflation tube collapse when the thrust reverser is actuated from the deployed configuration to the stowed configuration. Specifically, the sleeve shifts toward the forward structure to close off the reverse thrust flow opening. The pliable textile material allows the of vanes, inflation scoop, and inflation tube to fold, crease, roll, scrunch, twist, curl, crease, compress, or pack into the open-ended chamber.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
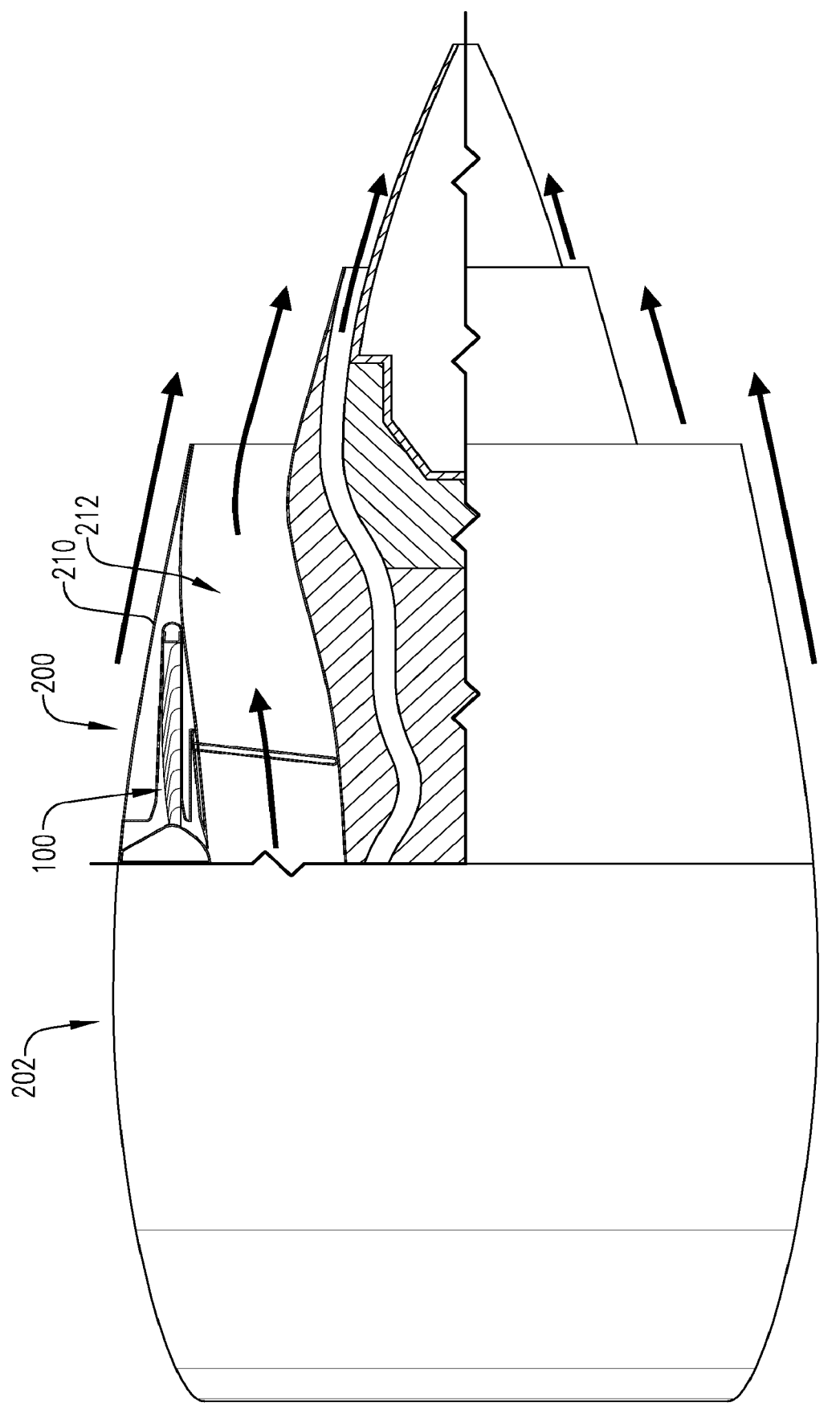
FIG. 1 is a partial cutaway elevation view of an aircraft engine comprising a thrust reverser including a textile cascade assembly constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Figure 2:
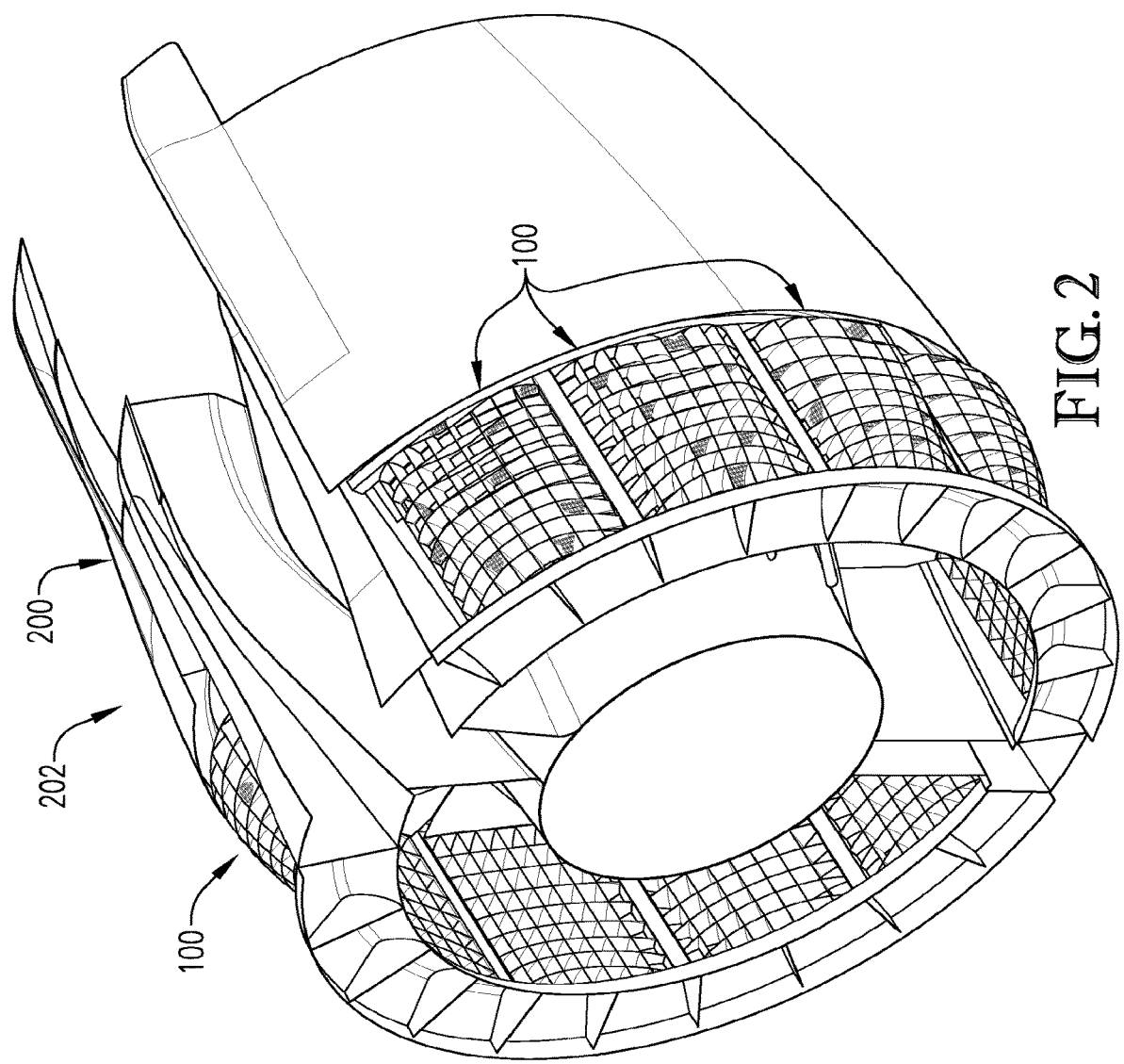
FIG. 2 is a perspective view of the aircraft engine of FIG. 1.
Figure 3:
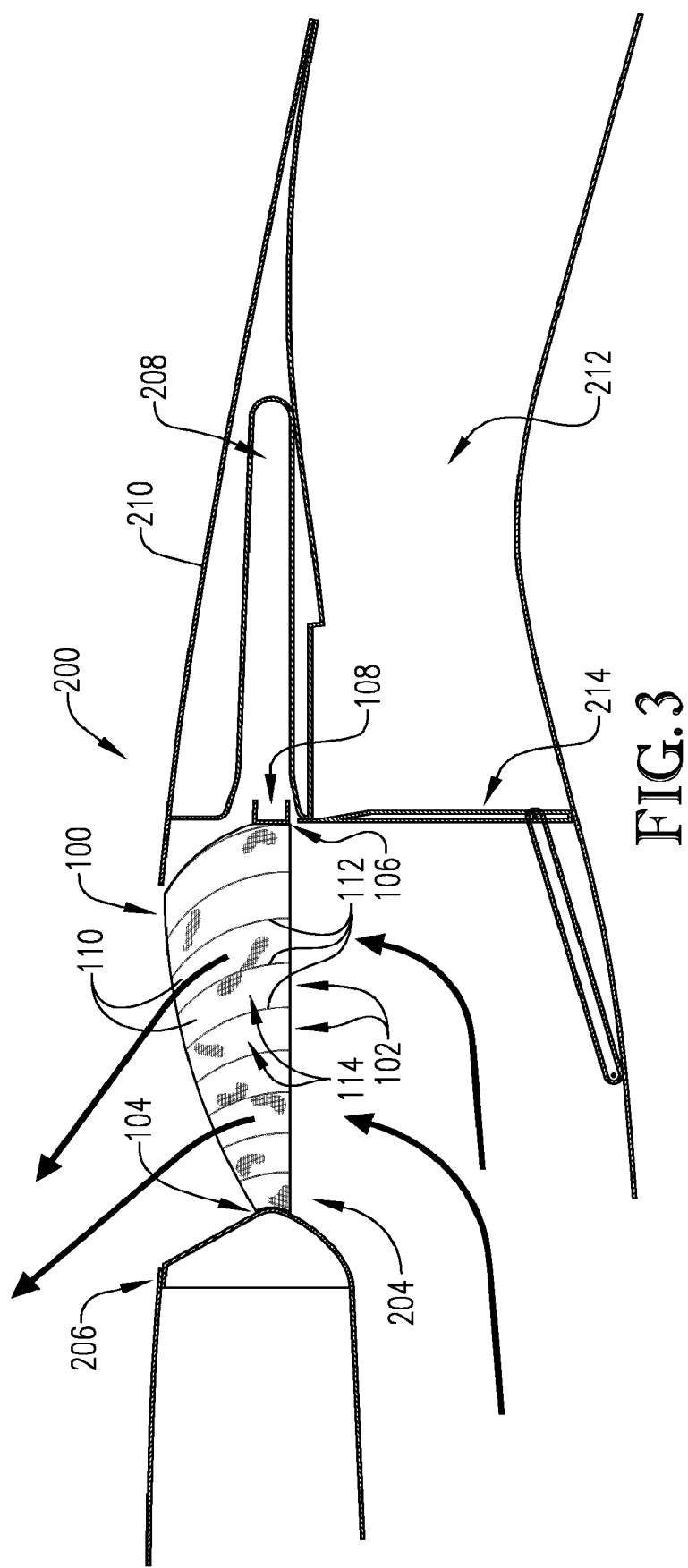
FIG. 3 is a cutaway elevation view of the thrust reverser and textile cascade assembly of FIG. 1.

Turning to FIGS. 1-3, a cascade assembly 100 constructed in accordance with an embodiment of the invention is illustrated. The cascade assembly 100 broadly comprises a plurality of vanes 102, a forward connection point 104, an aft connection point 106, and a rear support member 108. The cascade assembly 100 may be part of a thrust reverser 200 configured to generate reverse thrust from an aircraft engine 202 via a reverse thrust flow opening 204.

The plurality of vanes 102 may include a plurality of longitudinal panels 110 and a plurality of lateral panels 112. The plurality of vanes 102 form several channels 114 for redirecting fan duct flow through the reverse thrust flow opening 204 when the thrust reverser is in a deployed configuration and the plurality of vanes 102 are distended. The plurality of vanes 102 may be formed of a pliable textile material such as ripstop woven fabric or ballistic nylon. To that end, the plurality of vanes 102 may be joined via at least one of overlap seams, double line stitching, and directional stitching to limit deflection, increase stiffness, provide local stress relief, mitigate damage propagation, and reinforce the longitudinal panels 110 and lateral panels 112. Varying stitching orientation and spacing may increase resistance to stretching and locally re-enforce the longitudinal panels 110 and lateral panels 112. Each of the plurality of vanes 102 may have different depths to optimize flow redirection or to optimize material usage.

The plurality of vanes 102 may also include stiffening means such as flexible or rigid battens, cording, or webbing for shape reinforcement or to facilitate distension of the plurality of vanes 102. Heavier weave fabrics or multiple layers of fabric may tailor stiffness of portions of the plurality of vanes 102. Local areas of stiffness may be employed to promote folding near less stiff portions of the plurality of vanes 102 when the cascade assembly 100 is stowed.

The plurality of vanes 102 may also include semi-rigid or rigid inserts in portions to form upper and lower portions flow-redirecting shapes. The upper and lower portions may be connected by relatively flexible portions, thereby forming a fabric hinge.

The plurality of vanes 102 may include any number of vanes. In one embodiment, the plurality of vanes 102 include seventy-two vanes in a rectangular array of eight vanes by nine vanes. The plurality of vanes 102 may also include varying depth thicknesses depending on their position in the array. For example, vanes in the middle of the array may be deeper than vanes near sides of the array.

The longitudinal panels 110 extend from a forward end of the cascade assembly 100 to an aft end of the cascade assembly 100. In one embodiment, the longitudinal panels 110 may be substantially straight to have virtually no redirecting effect on the fan duct flow or to minimize a lateral component of the fan duct flow. Alternatively, the longitudinal panels 110 may be curved to increase a lateral component of the fan duct flow. The longitudinal panels 110 may improve fluid flow by promoting laminar fluid flow or turbulent fluid flow.

The lateral panels 112 extend from one side of the cascade assembly 100 to an opposite side of the cascade assembly 100. The lateral panels 112 may be curved to redirect the fan duct flow at least partially forward out of the reverse thrust flow opening 204.

The forward connection point 104 connects the plurality of vanes 102 to a forward structure 206 of the thrust reverser 200. The forward connection point 104 may have a fixed spacing from the aft connection point 106. Alternatively, the forward connection point 104 may be movable relative to the aft connection point 106 to longitudinally expand the plurality of vanes 102 when the thrust reverser 200 is deployed. In one embodiment, the forward connection point 104 spans a forward edge of the plurality of vanes 102 or is one of several discrete connection points. The forward connection point 104 may also be or include a rigid mount integrated throughout the plurality of vanes 102.

The aft connection point 106 connects the plurality of vanes 102 to the rear support member 108. The aft connection point 106 may have a fixed spacing from the forward connection point 104. Alternatively, the aft connection point 106 may be movable relative to the forward connection point 104 to longitudinally expand the plurality of vanes 102 when the thrust reverser 200 is deployed. In one embodiment, the aft connection point 106 spans a rear edge of the plurality of vanes 102 or is one of several discrete connection points. The aft connection point 106 may also be or include a rigid mount integrated throughout the plurality of vanes 102.

The rear support member 108 may be connected to the plurality of vanes 102 at the aft connection point 106 and may be positioned in an open-ended chamber 208 of a sleeve 210 of the thrust reverser 200. The rear support member 108 may be stationary relative to movement of the sleeve 210 when the thrust reverser 200 is actuated to a deployed configuration.

In one embodiment, the cascade assembly 100 may be heated via a tap feeding off the fan duct, a small volume of tempered bleed air off the engine 202, or electrically powered heaters. This may ensure proper distension of the plurality of vanes 102 at low ambient temperatures.

The cascade assembly 100 may also be integrated together with other cascade assemblies to create a single cascade assemblage instead of a series of discrete, spaced apart cascade assemblies. The cascade assemblage may be attached to the thrust reverser 200 at several attachment locations or via segmented rigid mounting flanges. Segmented mounting may employ interspaced flexible portions that facilitate collapsing of the cascade assemblage into a reduced volume for storage or shipping.

In use, the cascade assembly 100 redirects fan duct flow when the thrust reverser 200 is actuated from a stowed configuration to a deployed configuration. Specifically, the sleeve 210 shifts rearward relative to the forward structure 206 to create the reverse thrust flow opening 204 and expose the cascade assembly 100 in the reverse thrust flow opening 204. A blocker door 214 also blocks off a forward thrust flow path 212 to redirect fan duct flow to the reverse thrust flow opening 204. The fan duct flow passes through the channels 114 to distend the plurality of vanes 102. The distended plurality of vanes 102 turn the fan duct flow to have a forward component, thereby decelerating the aircraft.

The plurality of vanes 102 collapse when the thrust reverser 200 is actuated from the deployed configuration to the stowed configuration. Specifically, the sleeve 210 shifts toward the forward structure 206 to close off the reverse thrust flow opening 204. The pliable textile material allows the plurality of vanes 102 to fold, crease, roll, scrunch, twist, curl, crease, compress, or pack into the open-ended chamber 208. To that end, the plurality of vanes 102 may collapse along a single plane or axis or in at least two directions. The sleeve 210 may also facilitate collapse of the plurality of vanes 102 via funneling features or geometry.

The above-described cascade assembly 100 provides several advantages. For example, the textile cascade assembly 100 is lightweight and can be stowed in a small space. This allows for a reduction of engine nacelle diameter and weight and hence a reduction of aerodynamic drag. Smaller engine supports can also be used to support the smaller engines, further reducing weight and aerodynamic drag. The plurality of vanes 102 of the cascade assembly 100 may be longer or have more complex shapes, which may increase reverse thrust. The plurality of vanes 102 may also be easier to manufacture.

Figure 4:
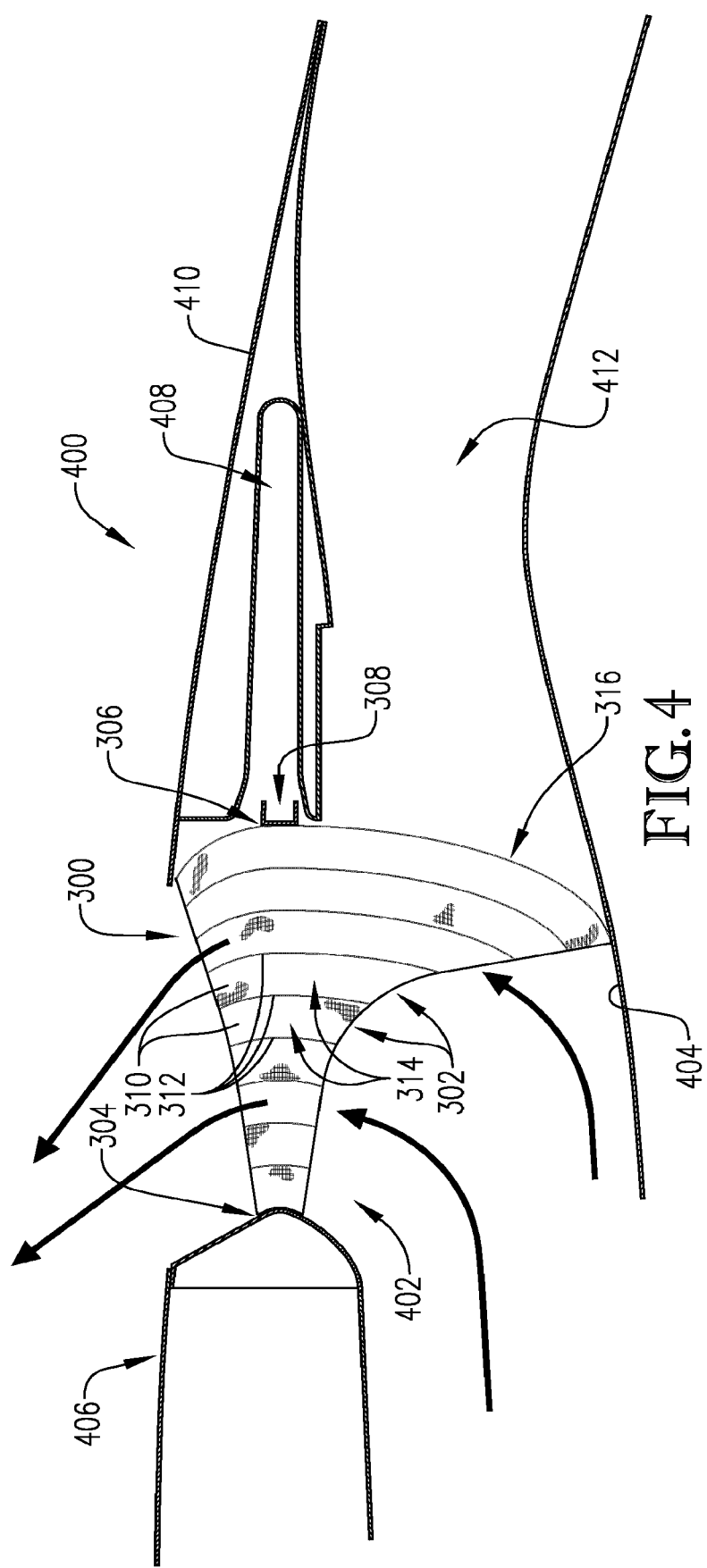
FIG. 4 is a cutaway elevation view of a thrust reverser including a textile cascade assembly constructed in accordance with another embodiment of the invention.

Turning to FIG. 4, a cascade assembly 300 constructed in accordance with another embodiment of the invention is illustrated. The cascade assembly 300 broadly comprises a plurality of vanes 302, a forward connection point 304, an aft connection point 306, and a rear support member 308. The cascade assembly 300 may be part of a thrust reverser 400 configured to generate reverse thrust from an aircraft engine via a reverse thrust flow opening 402.

The plurality of vanes 302 may include a plurality of longitudinal panels 310 and a plurality of lateral panels 312. The plurality of vanes 302 form several channels 314 for redirecting fan duct flow through the reverse thrust flow opening 402 when the thrust reverser is in a deployed configuration and the plurality of vanes 302 are distended.

Some of the plurality of vanes 302 (aft vanes in particular) may be closed-end cells configured to inflate instead of allow duct flow to pass through. Lateral panels 312 of the closed-end cells may form a blocker panel 316. The blocker panel 316 contacts an inner wall 404 of the thrust reverser 400 when the closed-end cells are inflated. The blocker panel 316 may include flexible, semi-rigid, or rigid material. In this way, the blocker panel 316 aids in cascade distension, flow redirection, and cascade support. The blocker panel 316 may cooperate with features on a sleeve of the thrust reverser 400 for stowing the cascade assembly 300. That is, the blocker panel 316 may be constructed to facilitate folding of the plurality of vanes 302 to be stowed in an open-ended chamber 408 of the sleeve 410.

The forward connection point 304 connects the plurality of vanes 302 to a forward structure 406 of the thrust reverser 400. In one embodiment, the forward connection point 304 spans a forward edge of the plurality of vanes 302. Alternatively, the forward connection point 304 is one of several discrete connection points. The forward connection point 304 may also be or include a rigid mount integrated throughout the plurality of vanes 302.

The aft connection point 306 connects the plurality of vanes 302 to the rear support member 308. In one embodiment, the aft connection point 306 spans a rear edge of the plurality of vanes 302. Alternatively, the aft connection point 306 may be one of several discrete connection points. The aft connection point 306 may also be or include a rigid mount integrated throughout the plurality of vanes 302.

The rear support member 308 may be connected to the plurality of vanes 302 at the aft connection point 306 and may be positioned in an open-ended chamber 408 of the sleeve 410. The rear support member 308 may be stationary relative to movement of the sleeve 410 when the thrust reverser 400 is actuated to a deployed configuration.

In use, the cascade assembly 300 redirects fan duct flow when the thrust reverser 400 is actuated from a stowed configuration to a deployed configuration. Specifically, the sleeve 410 shifts rearward relative to the forward structure 406 to create the reverse thrust flow opening 402 and expose the cascade assembly 300 in the reverse thrust flow opening 402. Some of the plurality of vanes 302 inflate so that the blocker panel 316 blocks off a forward thrust flow path 412 to redirect fan duct flow to the reverse thrust flow opening 402. The fan duct flow passes through the channels 314 to distend the plurality of vanes 302, or they may be distended due to the aforementioned vane inflation. The distended plurality of vanes 302 turn the fan duct flow to have a forward component thereby decelerating the aircraft.

The plurality of vanes 302 collapse when the thrust reverser 400 is actuated from the deployed configuration to the stowed configuration. Specifically, the sleeve 410 shifts toward the forward structure 406 to close off the reverse thrust flow opening 402. The pliable textile material allows the plurality of vanes 302 to fold, crease, roll, scrunch, twist, curl, crease, compress, or pack into the open-ended chamber 408.

Figure 5:
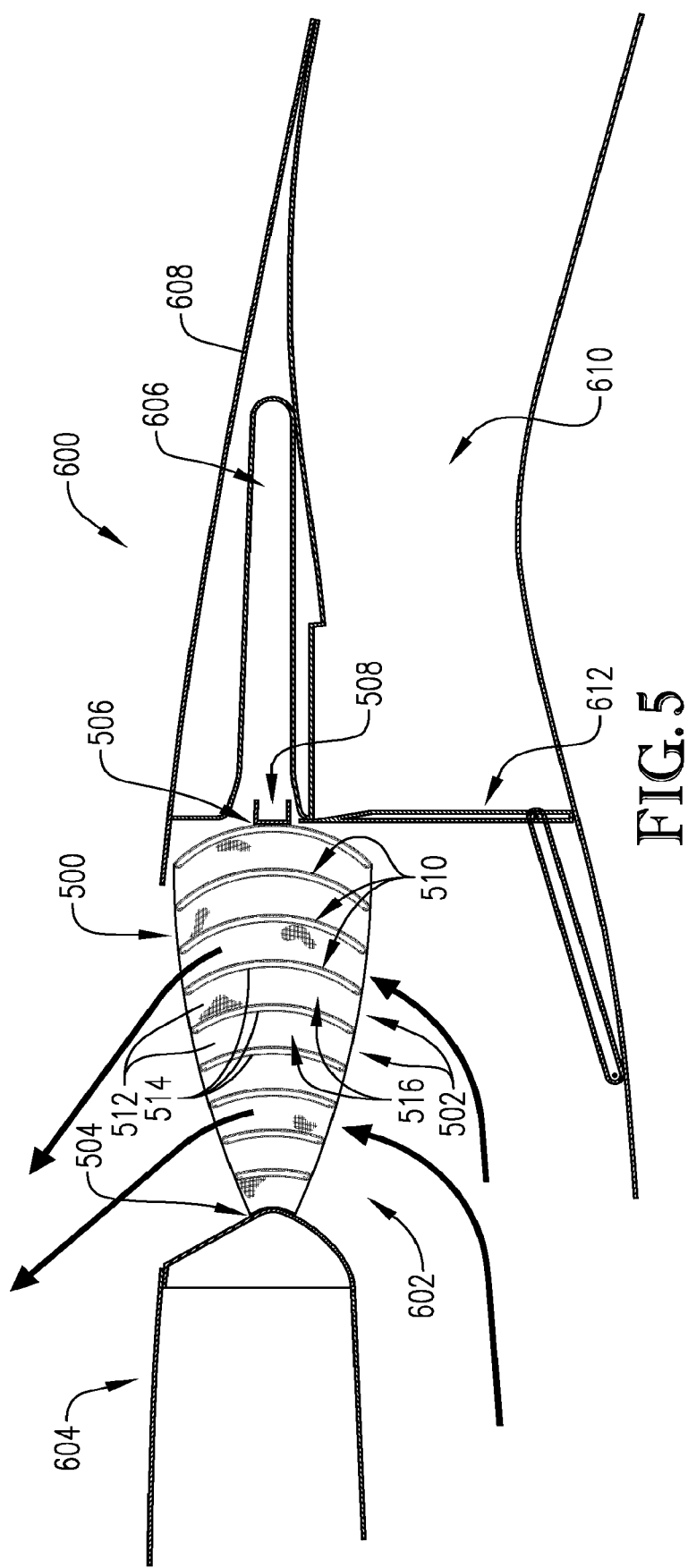
FIG. 5 is a cutaway elevation view of a thrust reverser including a textile cascade assembly constructed in accordance with another embodiment of the invention.

Turning to FIG. 5, a cascade assembly 500 constructed in accordance with another embodiment of the invention is illustrated. The cascade assembly 500 broadly comprises a plurality of vanes 502, a forward connection point 504, an aft connection point 506, a rear support member 508, and a plurality of biasing members 510. The cascade assembly 500 may be part of a thrust reverser 600 configured to generate reverse thrust from an aircraft engine via a reverse thrust flow opening 602.

The plurality of vanes 502 include a plurality of longitudinal panels 512 and a plurality of lateral panels 514. The plurality of vanes 502 form several channels 516 for redirecting fan duct flow through the reverse thrust flow opening 602 when the thrust reverser 600 is in a deployed configuration and the plurality of vanes 502 are distended.

The forward connection point 504 connects the plurality of vanes 502 to a forward structure 604 of the thrust reverser 600. In one embodiment, the forward connection point 504 spans a forward edge of the plurality of vanes 502. Alternatively, the forward connection point 504 may be one of several discrete connection points. The forward connection point 504 may also be or include a rigid mount integrated throughout the plurality of vanes 502.

The aft connection point 506 connects the plurality of vanes 502 to a sleeve 608 of the thrust reverser 600. In one embodiment, the aft connection point 506 spans a rear edge of the plurality of vanes 502. Alternatively, the aft connection point 506 may be one of several discrete connection points. The aft connection point 506 may also be or include a rigid mount integrated throughout the plurality of vanes 502.

The rear support member 508 may be connected to the plurality of vanes 502 at the aft connection point 506 and may be positioned in an open-ended chamber 606 of the sleeve 608. The rear support member 508 may be stationary relative to movement of the sleeve 608 when the thrust reverser 600 is actuated to a deployed configuration.

The biasing members 510 may be spaced apart from each other throughout the plurality of vanes 502 and may be sewn in or embedded in the lateral panels 514. The biasing members 510 may be compressed, coiled, or stressed when the plurality of vanes 502 are stowed. The biasing members 510 may be leaf springs, coil springs, torsion springs, or the like. The biasing members 510 urge the plurality of vanes 502 to a distended position when the thrust reverser 600 is deployed. The biasing members 510 may also stabilize and reinforce the longitudinal panels 512 and lateral panels 514 and reinforce a shape of the lateral panels 514.

In use, the cascade assembly 500 redirects fan duct flow when the thrust reverser 600 is actuated from a stowed configuration to a deployed configuration. Specifically, the sleeve 608 shifts rearward relative to the forward structure 604 to create the reverse thrust flow opening 602 and expose the cascade assembly 500 in the reverse thrust flow opening 602. A blocker door 612 also blocks off a forward thrust flow path 610 to redirect fan duct flow to the reverse thrust flow opening 602. The biasing members 510 expand, uncoil, or relax to distend the plurality of vanes 502 in the reverse thrust flow opening 602. The distended plurality of vanes 502 turn the fan duct flow to have a forward component, thereby decelerating the aircraft.

The plurality of vanes 502 collapse when the thrust reverser 600 is actuated from the deployed configuration to the stowed configuration. Specifically, the sleeve 608 shifts toward the forward structure 604 to close off the reverse thrust flow opening 602. The pliable textile material allows the plurality of vanes 502 to fold, crease, roll, scrunch, twist, curl, crease, compress, or pack into the open-ended chamber 606. The biasing members 510 are recompressed, recoiled, or restressed as the plurality of vanes 502 are stowed.

Figure 6:
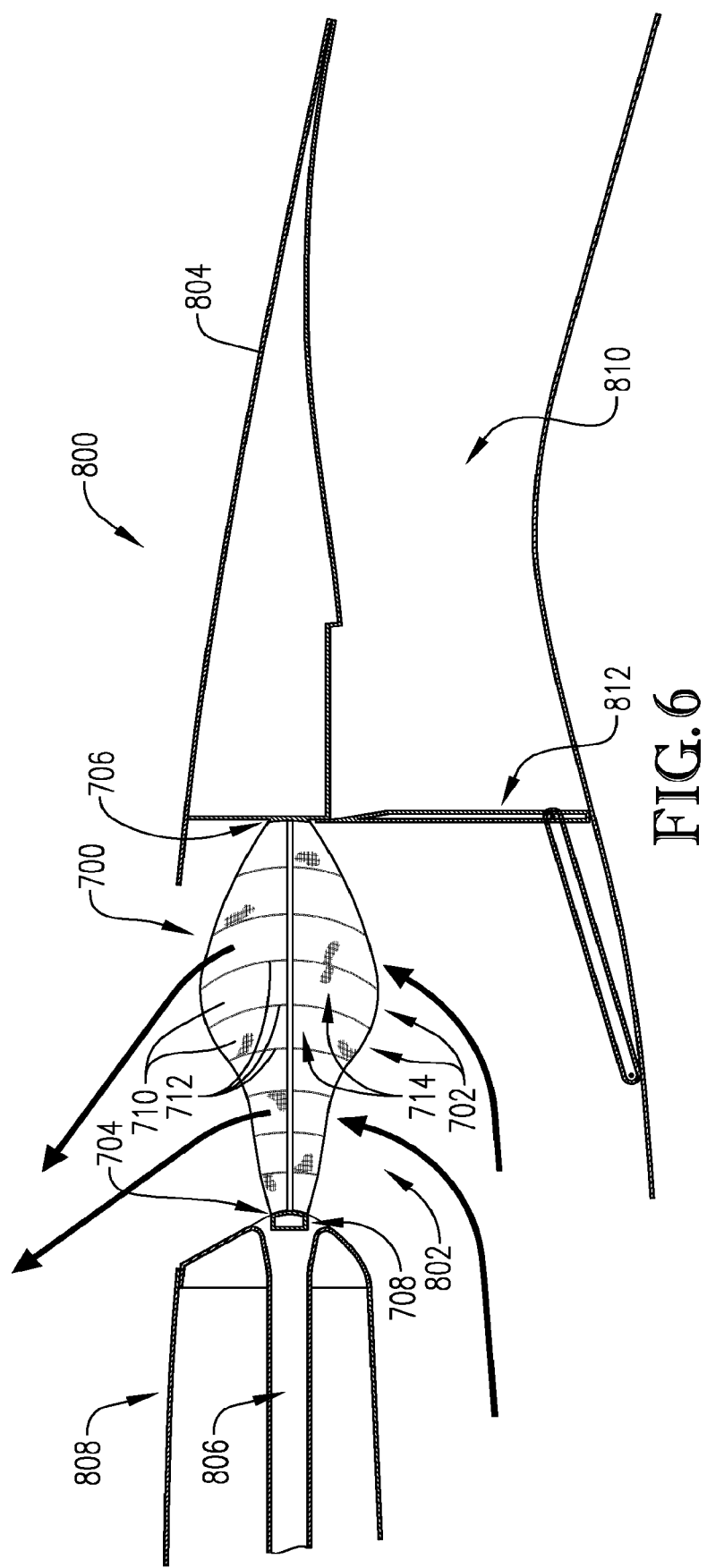
FIG. 6 is a cutaway elevation view of a thrust reverser including a textile cascade assembly constructed in accordance with another embodiment of the invention.

Turning to FIG. 6, a cascade assembly 700 constructed in accordance with another embodiment of the invention is illustrated. The cascade assembly 700 broadly comprises a plurality of vanes 702, a forward connection point 704, an aft connection point 706, and a forward support member 708. The cascade assembly 700 may be part of a thrust reverser 800 configured to generate reverse thrust from an aircraft engine 802 via a reverse thrust flow opening 802.

The plurality of vanes 702 include a plurality of longitudinal panels 710 and a plurality of lateral panels 712. The plurality of vanes 702 form several channels 714 for redirecting fan duct flow through the reverse thrust flow opening 802 when the thrust reverser 800 is in a deployed configuration and the plurality of vanes 702 are distended.

The forward connection point 704 connects the plurality of vanes 702 to the forward support member 708. In one embodiment, the forward connection point 704 spans a forward edge of the plurality of vanes 702. Alternatively, the forward connection point 704 may be one of several discrete connection points. The forward connection point 704 may also be or include a rigid mount integrated throughout the plurality of vanes 702.

The aft connection point 706 connects the plurality of vanes 702 to a sleeve 804 of the thrust reverser 800. In one embodiment, the aft connection point 706 spans a rear edge of the plurality of vanes 702. Alternatively, the aft connection point 706 may be one of several discrete connection points. The aft connection point 706 may also be or include a rigid mount integrated throughout the plurality of vanes 702.

The forward support member 708 may be connected to the plurality of vanes 702 at the forward connection point 706 and may be positioned in an open-ended chamber 806 of a forward structure 808 of the thrust reverser 800. The forward support member 708 may be configured to move at least somewhat in unison with the sleeve 804 of the thrust reverser 800 when the thrust reverser 800 is actuated to a deployed configuration. To that end, the forward support member 708 may translate within the open-ended chamber 806 during thrust reverser actuation.

In use, the cascade assembly 700 redirects fan duct flow when the thrust reverser 800 is actuated from a stowed configuration to a deployed configuration. Specifically, the sleeve 804 shifts rearward relative to the forward structure 808 to create the reverse thrust flow opening 802 and to draw the cascade assembly 700 out of the open-ended chamber 806 of the forward structure 808. A blocker door 812 also blocks off a forward thrust flow path 810 to redirect fan duct flow to the reverse thrust flow opening 802. The fan duct flow passes through the channels 714 to distend the plurality of vanes 702. The distended plurality of vanes 702 turn the fan duct flow to have a forward component thereby decelerating the aircraft.

The plurality of vanes 702 collapse when the thrust reverser 800 is actuated from the deployed configuration to the stowed configuration. Specifically, the sleeve 804 shifts toward the forward structure 808 to close off the reverse thrust flow opening 802. The pliable textile material allows the plurality of vanes 702 to fold, crease, roll, scrunch, twist, curl, crease, compress, or pack into the open-ended chamber 806. The pliable textile material reduces the storage space needed, which allows the plurality of vanes 702 to be stowed in the forward structure 1004 and decreases the overall size of the engine's nacelle.

Figure 7:
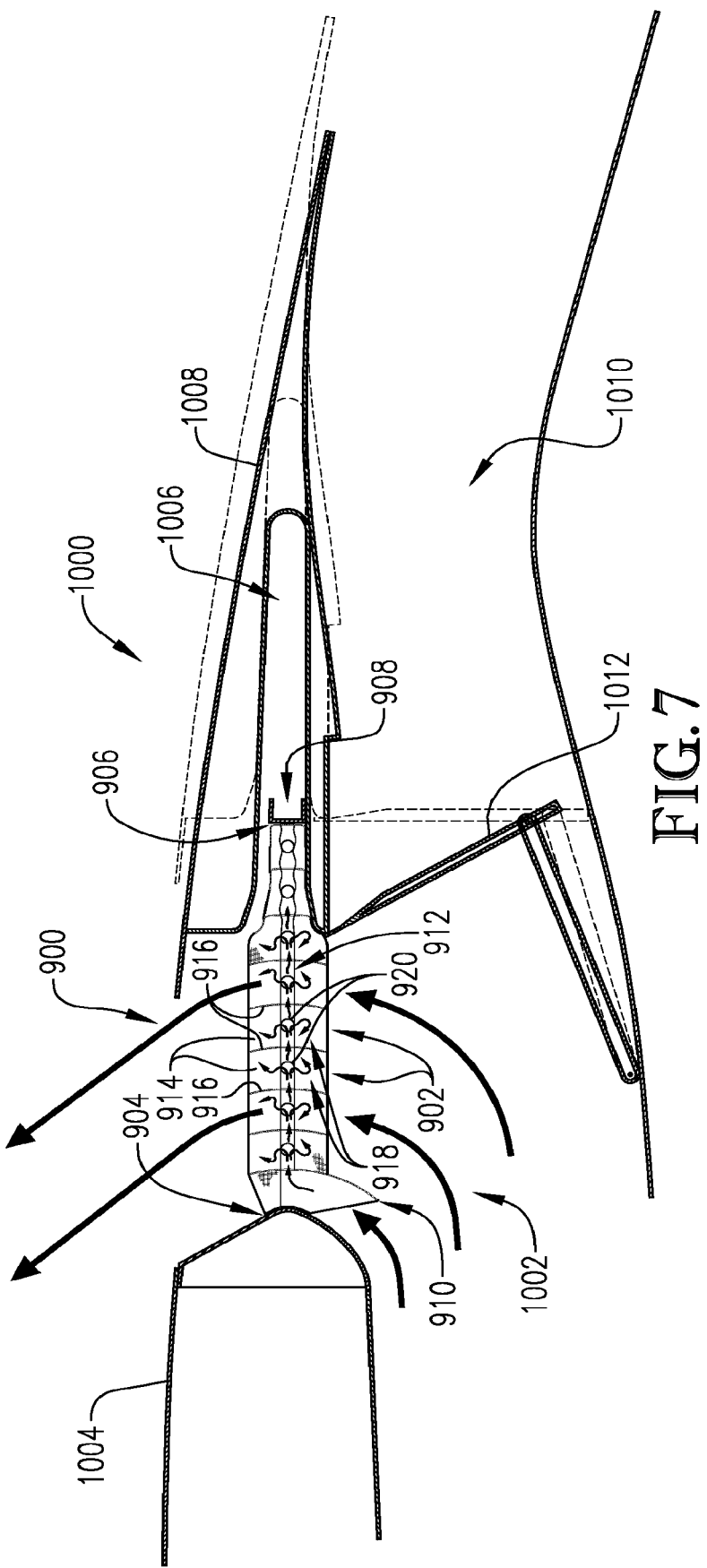
FIG. 7 is a cutaway elevation view of a thrust reverser including a textile cascade assembly constructed in accordance with another embodiment of the invention.

Turning to FIG. 7, a cascade assembly 900 constructed in accordance with another embodiment of the invention is illustrated. The cascade assembly 900 broadly comprises a plurality of vanes 902, a forward connection point 904, an aft connection point 906, a rear support member 908, an inflation scoop 910, and an inflation tube 912. The cascade assembly 900 may be part of a thrust reverser 1000 configured to generate reverse thrust from an aircraft engine via a reverse thrust flow opening 1002.

The plurality of vanes 902 include a plurality of longitudinal panels 914 and a plurality of lateral panels 916. The plurality of vanes 902 form several channels 918 for redirecting fan duct flow through the reverse thrust flow opening 1002 when the thrust reverser 1000 is in a deployed configuration and the plurality of vanes 902 are distended.

The forward connection point 904 connects the plurality of vanes 902 to a forward structure 1004 of the thrust reverser 1000. In one embodiment, the forward connection point 904 spans a forward edge of the plurality of vanes 902. Alternatively, the forward connection point 904 may be one of several discrete connection points. The forward connection point 904 may also be or include a rigid mount integrated throughout the plurality of vanes 902.

The aft connection point 906 connects the plurality of vanes 902 to a sleeve 1008 of the thrust reverser 1000. In one embodiment, the aft connection point 906 spans a rear edge of the plurality of vanes 902. Alternatively, the aft connection point 906 may be one of several discrete connection points. The aft connection point 906 may also be or include a rigid mount integrated throughout the plurality of vanes 902.

The rear support member 908 may be connected to the plurality of vanes 902 at the aft connection point 906 and may be positioned in an open-ended chamber 1006 of the sleeve 1008. The rear support member 908 may be stationary relative to movement of the sleeve 1008 when the thrust reverser 1000 is actuated to a deployed configuration. To that end, the rear support member 908 may translate within the open-ended chamber 1006 during thrust reverser actuation.

The inflation scoop 910 may be a modified vane near the front of the cascade assembly 900 and may be connected to the inflation tube 912 for directing some fluid flow into the inflation tube 912. To that end, the inflation scoop 910 may extend lower than the plurality of vanes 902 near the forward support structure 1004.

The inflation tube 912 may be fluidly connected between the inflation scoop 910 and some of the plurality of vanes 902. To that end, the inflation tube 912 may include a plurality of openings 920 for distributing the fluid flow collected by the inflation scoop 910 to the connected vanes 902. In one embodiment, the inflation tube 912 extends from the inflation scoop 910 near the front of the cascade assembly 900 to an aft end of the cascade assembly 900 with the openings 920 passing through certain longitudinal panels 914.

In use, the cascade assembly 900 redirects fan duct flow when the thrust reverser 1000 is actuated from a stowed configuration to a deployed configuration. Specifically, the sleeve 1008 shifts rearward relative to the forward structure 1004 to create the reverse thrust flow opening 1002 and expose the cascade assembly 900 in the reverse thrust flow opening 1002. A blocker door 1012 also blocks off a forward thrust flow path 1010 to redirect fan duct flow to the reverse thrust flow opening 1002. The inflation scoop 910 directs some of the fan duct flow into the inflation tube 912. The inflation tube 912 distributes the fan duct flow collected by the inflation scoop 910 to some of the plurality of vanes 902 via the openings 920 to distend the plurality of vanes 902. The distended plurality of vanes 902 turn the fan duct flow to have a forward component thereby decelerating the aircraft.

The plurality of vanes 902, inflation scoop 910, and inflation tube 912 collapse when the thrust reverser 1000 is actuated from the deployed configuration to the stowed configuration. Specifically, the sleeve 1008 shifts toward the forward structure 1004 to close off the reverse thrust flow opening 1002. The pliable textile material allows the plurality of vanes 902, inflation scoop 910, and inflation tube 912 to fold, crease, roll, scrunch, twist, curl, crease, compress, or pack into the open-ended chamber 1006. Alternatively, the inflation scoop 910 may be fixed and fit within the chamber 1006.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A thrust reverser for an aircraft engine, the thrust reverser comprising:
   a sleeve configured to be shifted to an open position to create a reverse thrust flow opening when the thrust reverser is actuated to a deployed configuration;
   a blocker door configured to be shifted to a blocking position to block a forward thrust flow path when the thrust reverser is actuated to the deployed configuration; and
   a cascade assembly comprising:
      a plurality of pliable textile vanes including a plurality of longitudinal panels and a plurality of lateral panels cooperatively forming a plurality of channels, the plurality of pliable textile vanes being shiftable between a collapsed position when the thrust reverser is in a stowed configuration and a distended position when the thrust reverser is in the deployed configuration to redirect fan duct flow,
      the plurality of longitudinal panels and the plurality of lateral panels being configured to pliably distend via the fan duct flow passing through the plurality of channels when the thrust reverser is actuated from the stowed configuration to the deployed configuration so that the plurality of lateral panels achieve a fan duct flow redirecting curvature in transitioning to the distended position and pliably collapse when the thrust reverser is actuated from the deployed configuration to the stowed configuration so that the plurality of lateral panels lose the fan duct flow redirecting curvature in transitioning to the collapsed position,
      the plurality of pliable textile vanes having at least two different depths when the plurality of pliable textile vanes are in the distended position.

2. The thrust reverser of claim 1, the cascade further comprising a plurality of battens configured to reinforce a shape of the plurality of pliable textile vanes when the plurality of pliable textile vanes are distended.

3. The thrust reverser of claim 1, the pliable textile vanes being made of ripstop material.

4. The thrust reverser of claim 1, the plurality of pliable textile vanes including directional reinforcement stitching.

5. The thrust reverser of claim 1, the plurality of pliable textile vanes including semi-rigid or rigid portions.

6. The thrust reverser of claim 5, the semi-rigid or rigid portions being formed via semi-rigid or rigid inserts.

7. The thrust reverser of claim 1, the plurality of pliable textile vanes being joined via overlap seams.

8. The thrust reverser of claim 1, the plurality of pliable textile vanes being joined by stitching having varied orientation and spacing.

9. The thrust reverser of claim 1, the plurality of pliable textile vanes forming a rectangular array and comprising vanes in the middle of the rectangular array and vanes near sides of the rectangular array, wherein the vanes in the middle of the rectangular array have greater depths than the vanes near the sides of the rectangular array.

10. The thrust reverser of claim 1, the longitudinal panels being curved in the distended position.

11. A thrust reverser for an aircraft engine, the thrust reverser comprising:
   a sleeve configured to be shifted to an open position to create a reverse thrust flow opening when the thrust reverser is actuated to a deployed configuration;
   a blocker door configured to be shifted to a blocking position to block a forward thrust flow path when the thrust reverser is actuated to the deployed configuration; and
   a cascade assembly comprising:
      a plurality of pliable textile vanes including a plurality of longitudinal panels and a plurality of lateral panels cooperatively forming a plurality of channels, the plurality of pliable textile vanes being shiftable between a collapsed position when the thrust reverser is in a stowed configuration and a distended position when the thrust reverser is in the deployed configuration to redirect fan duct flow,
      the plurality of longitudinal panels and the plurality of lateral panels being configured to pliably distend via the fan duct flow passing through the plurality of channels when the thrust reverser is actuated from the stowed configuration to the deployed configuration so that the plurality of lateral panels achieve a fan duct flow redirecting curvature in transitioning to the distended position and pliably collapse when the thrust reverser is actuated from the deployed configuration to the stowed configuration so that the plurality of lateral panels lose the fan duct flow redirecting curvature in transitioning to the collapsed position,
      the plurality of pliable textile vanes having at least two different depths when the plurality of pliable textile vanes are in the distended position and a maximum collapsed depth smaller than the at least two different depths when the plurality of pliable textile vanes are in the collapsed position.

12. The thrust reverser of claim 11, the cascade further comprising a plurality of battens configured to reinforce a shape of the plurality of pliable textile vanes when the plurality of pliable textile vanes are distended.

13. The thrust reverser of claim 11, the pliable textile vanes being made of ripstop material.

14. The thrust reverser of claim 11, the plurality of pliable textile vanes including directional reinforcement stitching.

15. The thrust reverser of claim 11, the plurality of pliable textile vanes including semi-rigid or rigid portions.

16. The thrust reverser of claim 15, the semi-rigid or rigid portions being formed via semi-rigid or rigid inserts.

17. The thrust reverser of claim 11, the plurality of pliable textile vanes being joined by stitching having varied orientation and spacing.

18. The thrust reverser of claim 11, the plurality of pliable textile vanes forming a rectangular array and comprising vanes in the middle of the rectangular array and vanes near sides of the rectangular array, wherein the vanes in the middle of the rectangular array have greater depths than the vanes near the sides of the rectangular array.

19. The thrust reverser of claim 11, the longitudinal panels being curved in the distended position.

20. A thrust reverser for an aircraft engine, the thrust reverser comprising:
   a sleeve configured to be shifted to an open position to create a reverse thrust flow opening when the thrust reverser is actuated to a deployed configuration, the sleeve including an open-ended chamber;
   a forward structure opposing the open-ended chamber;
   a blocker door configured to be shifted to a blocking position to block a forward thrust flow path when the thrust reverser is actuated to the deployed configuration; and
   a cascade assembly comprising:
      a plurality of pliable textile vanes including a plurality of substantially straight longitudinal panels and a plurality of lateral panels cooperatively forming a plurality of channels, the plurality of pliable textile vanes being shiftable between a collapsed position when the thrust reverser is in a stowed configuration and a distended position when the thrust reverser is in the deployed configuration to redirect fan duct flow,
      the plurality of longitudinal panels and the plurality of lateral panels being configured to pliably distend via the fan duct flow passing through the plurality of channels when the thrust reverser is actuated from the stowed configuration to the deployed configuration so that the plurality of lateral panels achieve a fan duct flow redirecting curvature in transitioning to the distended position and pliably collapse when the thrust reverser is actuated from the deployed configuration to the stowed configuration so that the plurality of lateral panels lose the fan duct flow redirecting curvature in transitioning to the collapsed position,
      the plurality of pliable textile vanes having at least two different depths when the plurality of pliable textile vanes are in the distended position and a maximum collapsed depth smaller than the at least two different depths when the plurality of pliable textile vanes are in the collapsed position;
      a forward connection point configured to connect the plurality of pliable textile vanes to the forward structure;
      a rear support member configured to be positioned in the open-ended chamber; and
      an aft connection point opposite the forward connection point and configured to connect the plurality of pliable textile vanes to the rear support member.

* * * * *